United States Patent
Kilpatrick et al.

(10) Patent No.: US 10,657,225 B2
(45) Date of Patent: May 19, 2020

(54) PROVIDING BLOCKCHAIN-BASED SUBSCRIPTION-AS-A-SERVICE MANAGEMENT

(71) Applicant: Red Hat, Inc., Raleigh, NC (US)

(72) Inventors: Justin M. Kilpatrick, Raleigh, NC (US); Gregory N. Hoelzer, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 484 days.

(21) Appl. No.: 15/393,940

(22) Filed: Dec. 29, 2016

(65) Prior Publication Data

US 2018/0189755 A1     Jul. 5, 2018

(51) Int. Cl.
    G06F 21/10      (2013.01)
    G06Q 20/10      (2012.01)
    (Continued)

(52) U.S. Cl.
    CPC .............. G06F 21/10 (2013.01); G06F 21/64 (2013.01); G06Q 20/102 (2013.01);
    (Continued)

(58) Field of Classification Search
    CPC ....... G06Q 20/102; G06F 21/10; G06F 21/64; H04L 12/14; H04L 12/1439; H04L 67/10;
    (Continued)

(56) References Cited

U.S. PATENT DOCUMENTS 8,588,110 B2   11/2013   Raleigh
8,639,625 B1    1/2014   Ginter et al.
(Continued)

OTHER PUBLICATIONS

Richard Dennis et al., A Temporal Blockchain: a formal Analysis, Oct. 1, 2016, 2016 International Conference on Collaboration Technologies and Systems (CTS) (pp. 430-437) (Year: 2016).*

(Continued)

*Primary Examiner* — Mamon Obeid
*Assistant Examiner* — Chunling Ding
(74) *Attorney, Agent, or Firm* — Withrow & Terranova, PLLC

(57) ABSTRACT

Providing blockchain-based subscription-as-a-service management is disclosed. In one example, a node within a customer network begins execution of a subscription-as-a-service software instance. An activation agent of the node broadcasts an activation transaction, requesting activation of the subscription-as-a-service software instance, to other nodes of the customer network. A block-issuing node within the customer network, upon receiving the activation transaction, determines whether to activate the subscription-as-a-service software instance. If so, a block-issuing agent of the block-issuing node generates a blockchain block containing the activation transaction as part of a blockchain. The blockchain block is then broadcast back to the customer network, where it is eventually received by the node executing the subscription-as-a-service software instance. Based on the blockchain block, the node enables continued execution of the subscription-as-a-service software instance. At the end of a billing period, the blockchain may be used to generate an invoice to a subscribing customer.

10 Claims, 10 Drawing Sheets

(51) Int. Cl.
  *H04L 29/08* (2006.01)
  *H04L 12/14* (2006.01)
  *H04M 15/00* (2006.01)
  *G06F 21/64* (2013.01)
  *H04M 17/00* (2006.01)
  *H04W 4/24* (2018.01)
  *G06Q 20/22* (2012.01)

(52) U.S. Cl.
  CPC ....... *G06Q 20/223* (2013.01); *H04L 12/1407* (2013.01); *H04L 12/1439* (2013.01); *H04L 67/10* (2013.01); *H04L 67/16* (2013.01); *H04M 15/00* (2013.01); *H04M 15/50* (2013.01); *H04M 15/51* (2013.01); *H04M 17/20* (2013.01); *H04M 17/204* (2013.01); *H04W 4/24* (2013.01)

(58) Field of Classification Search
  CPC ....... H04L 67/16; H04M 15/00; H04M 15/50; H04M 15/51; H04M 17/20; H04M 17/204; H04W 4/24
  See application file for complete search history.

(56) References Cited

U.S. PATENT DOCUMENTS

| | | | |
|---|---|---|---|
| 9,253,211 | B2 | 2/2016 | Hoole et al. |
| 9,672,499 | B2 | 6/2017 | Yang et al. |
| 9,892,460 | B1 | 2/2018 | Winklevoss et al. |
| 10,068,228 | B1 | 9/2018 | Winklevoss et al. |
| 10,269,009 | B1 | 4/2019 | Winklevoss et al. |
| 10,354,325 | B1 | 7/2019 | Skala et al. |
| 2007/0130079 | A1* | 6/2007 | Ivanov .................. G06F 21/10 705/59 |
| 2008/0021836 | A1* | 1/2008 | Lao ........................ G06F 21/10 705/54 |
| 2008/0140836 | A1* | 6/2008 | Miyawaki .............. A63F 13/12 709/225 |
| 2012/0054107 | A1* | 3/2012 | Biswas .................. G06F 21/10 705/53 |
| 2013/0198856 | A1 | 8/2013 | Li et al. |
| 2013/0246303 | A1 | 9/2013 | Finck et al. |
| 2014/0181998 | A1 | 6/2014 | Hunt et al. |
| 2015/0067819 | A1 | 3/2015 | Shribman et al. |
| 2015/0143456 | A1 | 5/2015 | Raleigh et al. |
| 2015/0287026 | A1 | 10/2015 | Yang et al. |
| 2015/0332283 | A1 | 11/2015 | Witchey |
| 2016/0055322 | A1 | 2/2016 | Thomas |
| 2016/0292672 | A1 | 10/2016 | Fay et al. |
| 2017/0091397 | A1 | 3/2017 | Shah |
| 2017/0116693 | A1* | 4/2017 | Rae .................... G06Q 20/3827 |
| 2017/0125404 | A1 | 5/2017 | Chang |
| 2017/0195457 | A1* | 7/2017 | Smith, II ............... H04L 63/10 |
| 2017/0213267 | A1 | 7/2017 | Degaugue et al. |
| 2017/0331896 | A1* | 11/2017 | Holloway ................. H04L 9/12 |
| 2018/0089256 | A1 | 3/2018 | Wright, Sr. |
| 2018/0089651 | A9* | 3/2018 | Lund ..................... G06F 21/00 |
| 2018/0101906 | A1* | 4/2018 | McDonald ............. G06Q 40/04 |
| 2018/0121909 | A1 | 5/2018 | Christidis et al. |
| 2018/0144378 | A1 | 5/2018 | Perez et al. |
| 2018/0183687 | A1* | 6/2018 | Dementev ............... H04L 41/50 |
| 2018/0205555 | A1* | 7/2018 | Watanabe .............. G06Q 10/06 |
| 2018/0216946 | A1 | 8/2018 | Gueye |
| 2018/0374173 | A1* | 12/2018 | Chen ...................... G06F 21/10 |

OTHER PUBLICATIONS

Ruland, C. et al., Secure subscription management on agent based platforms, Jan. 1, 2000, IEEE Globecom '00 Workshop. 2000 IEEE Service Portability and Virtual Customer Environments (IEEE Cat. No. 00EX498) (pp. 121-127) (Year: 2000).*

Bheemaiah, Kariappa, "Block Chain 2.0: The Renaissance of Money," Wired, available at least as early as Oct. 27, 2016, 14 pages, https://www.wired.com/insights/2015/01/block-chain-2-0/.

Brantley, Bill, "The Data Briefing: I, for One, Welcome Our New Chatbot Blockchain Digital Autonomous Organizations," DIGITALGOV, Jul. 6, 2016, 6 pages, https://www.digitalgov.gov/2016/07/06/the-data-briefing-i-for-one-welcome-our-new-chatbot-blockchain-digital-autonomous-organizations/.

Author Unknown, "Network," Bitcoin Wiki, last modified Feb. 20, 2016, 4 pages, https://en.bitcoin.it/wiki/Network.

Author Unknown, "Windows Activation in Development and Test Environments," Microsoft Corporation, White Paper, 2010, 11 pages, https://technet.microsoft.com/en-us/en%C2%ADus/library/dd981009.aspx.

linewbie.com, "Does an un-confirmed Bitcoin transaction expire?," Linux Open Source Blog, Jul. 1, 2016, 12 pages, http://linewbie.com/2016/07/does-an-un-confirmed-bitcoin-transaction-expire.html.

Nakamoto, Satoshi, "Bitcoin: A Peer-to-Peer Electronic Cash System," Bitcoin.org, White Paper, Mar. 2009, 9 pages.

Non-Final Office Action for U.S. Appl. No. 15/408,504, dated Apr. 5, 2019, 8 pages.

Notice of Allowance for U.S. Appl. No. 15/408,504, dated Sep. 17, 2019, 9 pages.

* cited by examiner

US 10,657,225 B2

PROVIDING BLOCKCHAIN-BASED SUBSCRIPTION-AS-A-SERVICE MANAGEMENT

TECHNICAL FIELD

The examples relate generally to software provided under a subscription-as-a-service model, and, in particular, to providing mechanisms for managing usage of and billing for subscription-as-a-service software usage.

BACKGROUND

Subscription-as-a-service is a software licensing and delivery model in which software is licensed on a subscription basis for a specified time interval (e.g., a billing period). Unlike conventional software-as-a-service (SaaS) models in which the software is centrally hosted, the subscription-as-a-service model employs the subscription customer's hardware to provide decentralized hosting and licensing management.

SUMMARY

The examples include providing blockchain-based subscription-as-a-service management. A blockchain-based subscription-as-a-service management model according to examples disclosed herein may be useful for leveraging the ordered and distributed characteristics of a blockchain to manage and track usage of subscription-as-a-service software instances without the need for implementing an extensive support infrastructure. As a node (e.g., a physical or virtual server) of a subscribing customer's network begins execution of a subscription-as-a-service software instance, an activation agent of the node broadcasts an activation transaction, requesting activation of the subscription-as-a-service software instance, to other nodes of the customer network. A block-issuing node, upon receiving the activation transaction, determines whether to activate the subscription-as-a-service software instance. If so, a block-issuing agent of the block-issuing node generates a blockchain block containing the activation transaction as part of a blockchain. The blockchain block is then broadcast back to the customer network, where it is eventually received by the node executing the subscription-as-a-service software instance. Based on the blockchain block, the node enables continued execution of the subscription-as-a-service software instance. At the end of a billing period, the blockchain may be used to generate an invoice to the subscribing customer.

In another example, a method for providing blockchain-based subscription-as-a-service on customer networks is provided. The method includes executing, by a node of a plurality of nodes within a customer network, a subscription-as-a-service software instance. The method further includes broadcasting, by an activation agent of the node executing the subscription-as-a-service software instance, an activation transaction for requesting activation of the subscription-as-a-service software instance to one or more nodes of the plurality of nodes. The method also includes receiving, by the activation agent of the node executing the subscription-as-a-service software instance, a blockchain block comprising the activation transaction as part of a blockchain. The method additionally includes determining, by the activation agent of the node executing the subscription-as-a-service software instance, whether the subscription-as-a-service software instance was successfully activated, based on the blockchain block. The method further includes, responsive to determining that the subscription-as-a-service software instance was successfully activated, enabling continued execution of the subscription-as-a-service software instance.

In another example, a computing device is provided. The computing device includes a memory, and a processor device communicatively coupled to the memory and a plurality of nodes of a customer network. The processor device is to execute a subscription-as-a-service software instance. The processor device further is to broadcast, using an activation agent, an activation transaction for requesting activation of the subscription-as-a-service software instance to one or more nodes of the plurality of nodes. The processor device also is to receive, using the activation agent, a blockchain block comprising the activation transaction as part of a blockchain. The processor device additionally is to determine, using the activation agent, whether the subscription-as-a-service software instance was successfully activated, based on the blockchain block. The processor device further is to, responsive to determining that the subscription-as-a-service software instance was successfully activated, enable continued execution of the subscription-as-a-service software instance.

In another example, a computing device is provided. The computing device includes a memory, and a processor device communicatively coupled to the memory and a plurality of nodes of a customer network. The processor device is to receive, using a block-issuing agent, an activation transaction for requesting activation of a subscription-as-a-service software instance. The processor device further is to generate, using the block-issuing agent, a blockchain block comprising the activation transaction as part of a blockchain. The processor device also is to broadcast, using the block-issuing agent, the blockchain block to one or more nodes of the plurality of nodes.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

Figure 1:
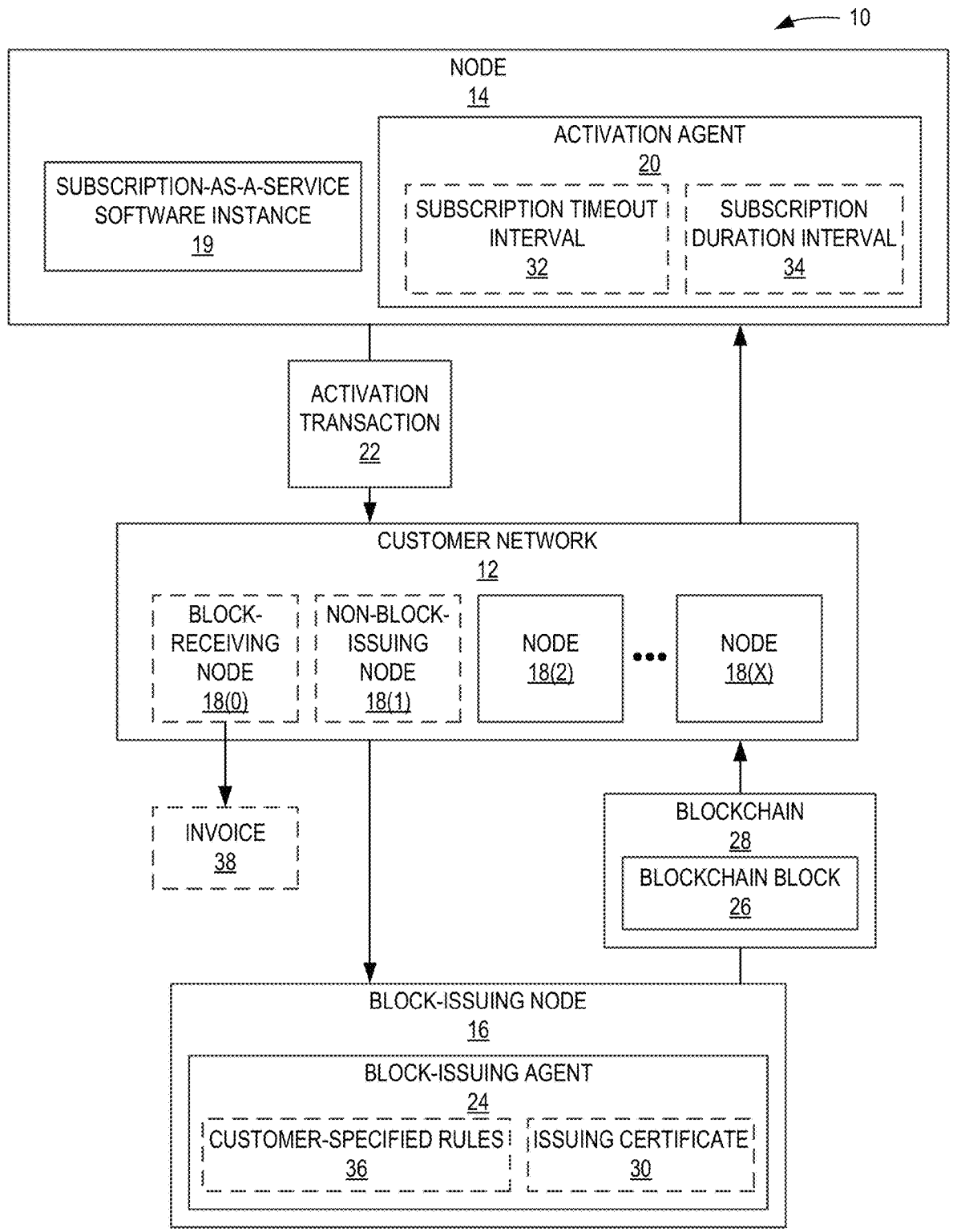
FIG. 1 is a block diagram of a system in which examples may be practiced.

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first message" and "second message," and does not imply a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the element unless otherwise explicitly specified.

Subscription-as-a-service is a software licensing and provisioning model in which customers pay a recurring subscription fee for access to a software product for deployment on local physical or virtual servers or cloud-based servers for a specified time interval (e.g., a billing period). The subscription-as-a-service model enables subscribing customers to securely and efficiently deploy and operate any available version of software, and to access support resources during a subscription period. However, conventional subscription-as-a-service provision may require an extensive and expensive infrastructure for managing access to and tracking usage of subscription-as-a-service software, and to provide complete and accurate data for billing. For instance, some subscription-as-a-service platforms may employ a web-based authentication application programming interface (API), which may require a large number of subscription servers to provide timely responses to subscription activation requests.

The examples described herein include providing blockchain-based subscription-as-a-service management. A blockchain-based subscription-as-a-service management model according to examples disclosed herein may be useful for leveraging the ordered and distributed characteristics of a blockchain to manage and track usage of subscription-as-a-service software instances without the need for implementing an extensive support infrastructure. As used herein, a "blockchain" refers to a decentralized database that maintains a list of ordered records ("blockchain blocks") that, once recorded, are resistant to retroactive modification. In some examples, once recorded, the data in a blockchain block cannot be altered retroactively. In some examples, each blockchain block within the blockchain contains one or more transactions, along with a hash of the prior blockchain block.

In this regard, FIG. 1 is a block diagram of a system 10 in which examples may be practiced. The system 10 includes a customer network 12 of a subscribing customer (not shown). The customer network 12 according to some examples may include a private network accessible only to the subscription customer, and/or a publicly accessible network. The customer network 12 is connected to a node 14 and a block-issuing node 16, and further includes a plurality of other nodes 18(0)-18(X). As used herein, a "node" may refer to a physical computing device or a virtual server that is communicatively coupled to other nodes of the customer network 12. It is to be understood that, although only a single block-issuing node 16 is illustrated in FIG. 1, the customer network 12 may include multiple block-issuing nodes 16, each corresponding in functionality to the block-issuing node 16 described herein.

The node 14 is configured to execute a subscription-as-a-service software instance 19 provided by a subscription-as-a-service provider (not shown). The node 14 also provides an activation agent 20 that interacts with block-issuing nodes, such as the block-issuing node 16, to activate the subscription-as-a-service software instance 19 for execution. When the subscription-as-a-service software instance 19 is first executed by the node 14, the activation agent 20 generates an activation transaction 22. The activation transaction 22 may include any data necessary to identify and track execution of the subscription-as-a-service software instance 19, and represents a request for activation of the subscription-as-a-service software instance 19 according to the terms of the applicable subscription. The activation transaction 22 is broadcast to the customer network 12, where it may be received by one or more of the nodes 18(0)-18(X) and/or the block-issuing node 16. In some examples, if the activation transaction 22 is received by a non-block-issuing node, such as the non-block-issuing node 18(1), the non-block-issuing node 18(1) simply re-broadcasts the activation transaction 22 to the customer network 12.

The activation transaction 22 is eventually received by the block-issuing node 16. A block-issuing agent 24 of the block-issuing node 16 then generates a blockchain block 26 as part of a blockchain 28 that is maintained by the block-issuing node 16 (and any other block-issuing nodes within the customer network 12). It is to be understood that the block-issuing agent 24 may employ any mechanism known in the art for generating the blockchain block 26, and for requesting and receiving pending blockchain blocks 26 within the customer network 12. The blockchain block 26 packages the activation transaction 22 with one or more other transactions.

In some examples, the block-issuing agent 24 may also insert a billing transaction (not shown) including billing data into the blockchain block 26 to ensure that billing for usage of the subscription-as-a-service software instance 19 is transparent to the subscribing customer. For instance, the billing transaction according to some examples may be created and signed by the subscription-as-a-service provider, and either inserted into a blockchain block 26 issued by the subscription-as-a-service provider or broadcast into the customer network 12 and packaged into a blockchain block 26 by the block-issuing agent 24. Some examples of the block-issuing agent 24 may also provide additional security by signing the blockchain block 26 using an issuing certificate 30 that is provided by the subscription-as-a-service software provider. For instance, the issuing certificate 30 may comprise a customer-generated signing key that is subsequently signed by the subscription-as-a-service software provider and used to approve the blockchain block 26 generated by the block-issuing agent 24.

After the blockchain block 26 is generated, the block-issuing agent 24 broadcasts the blockchain block 26 to the customer network 12, where it may be received by one or more of the nodes 18(0)-18(X) and/or the node 14. The blockchain block 26 may be re-broadcast within the customer network 12, and is eventually received by the node 14. Upon receipt of the blockchain block 26, the node 14 determines that the subscription-as-a-service software instance 19 was successfully activated, and thus enables continued execution of the subscription-as-a-service software instance 19.

In some examples, the activation agent 20 of the node 14 may specify a subscription timeout interval 32, which indicates a period of time during which the blockchain block 26 must be received by the node 14 in order to successfully activate the subscription-as-a-service software instance 19. Thus, in such examples, the node 14 may periodically determine whether the subscription timeout interval 32 has expired before the blockchain block 26 is received. If the subscription timeout interval 32 expires before the blockchain block 26 is received, the node 14 terminates execution of the subscription-as-a-service software instance 19. Some examples may also provide a subscription duration interval 34 specifying a period of time during which the subscription-as-a-service software instance 19 may be executed according to the terms of the subscription. Accordingly, if the subscription-as-a-service software instance 19 is successfully activated, the node 14 may then continue executing the subscription-as-a-service software instance 19 until the subscription duration interval 34 has elapsed.

According to some examples, the block-issuing agent 24 of the block-issuing node 16 may apply one or more customer-specified rules 36 when determining whether to approve activation of the subscription-as-a-service software instance 19. As non-limiting examples, the one or more customer-specified rules 36 may include a rule regarding a number of active subscriptions and/or a rule regarding a subscription budget. In this manner, the block-issuing agent 24 may ensure that usage of the one or more customer-specified rules 36 adheres to the terms of the subscription and/or that the subscribing customer remains within a predetermined subscription budget. The block-issuing agent 24 may also perform maintenance on the blockchain 28 by deleting one or more blockchain blocks (such as the blockchain block 26) that are older than a current billing period. In this manner, the blockchain 28 may be constrained from growing so large that it becomes too unwieldy to use.

In some examples, the customer network 12 may also include one or more block-receiving nodes, such as the block-receiving node 18(0). The block-receiving node 18(0) may be provided by the subscription-as-a-service provider for the purpose of generating an invoice 38, based on the blockchain 28, at the end of a billing period. Some examples may provide that the block-receiving node 18(0) is located at a facility of the subscription-as-a-service provider rather than within the customer network 12.

Figure 2:
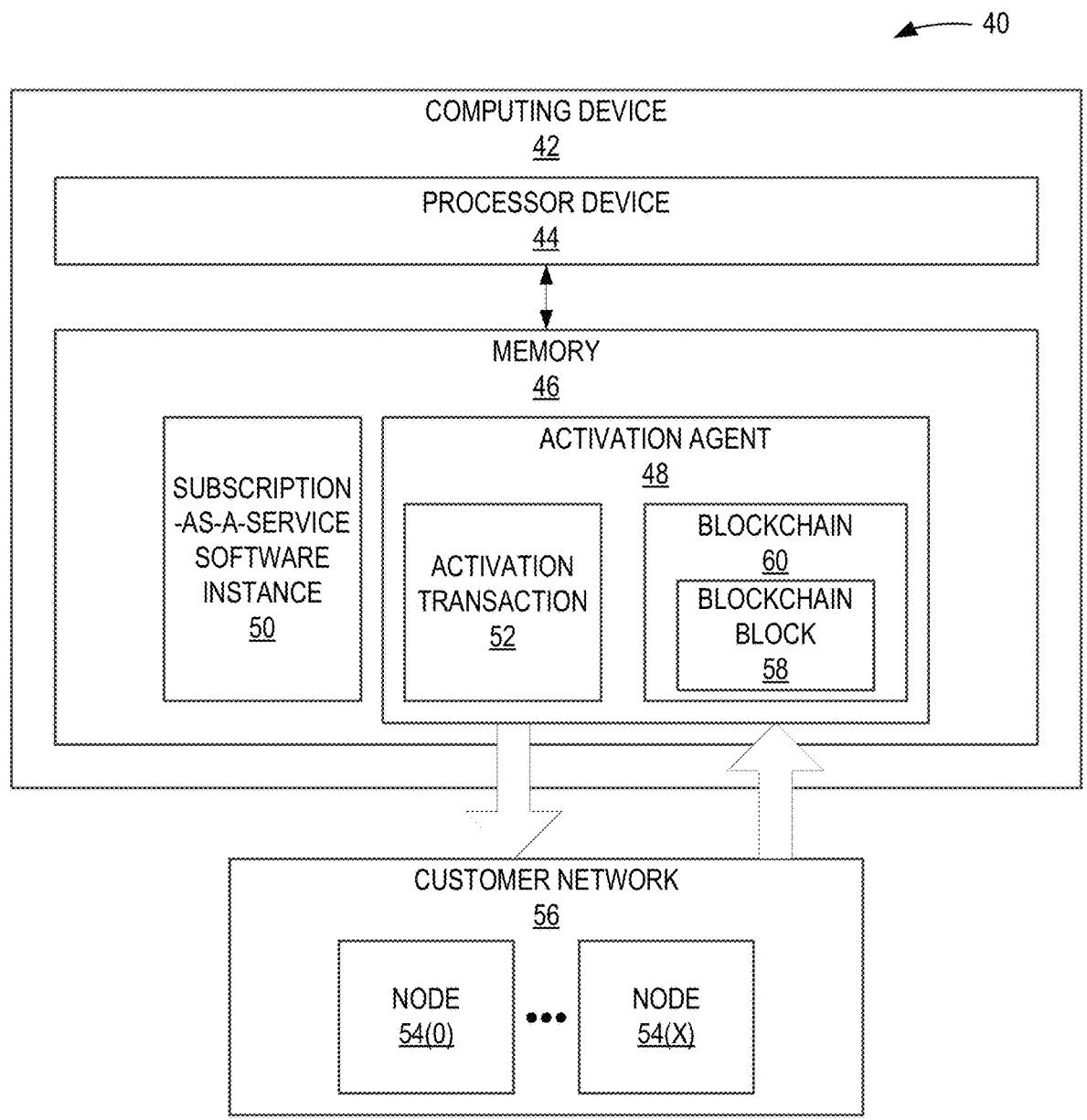
FIG. 2 is a block diagram of a node for executing and requesting activation of a subscription-as-a-service software instance.

FIG. 2 is a block diagram illustrating a node 40 for executing and requesting activation of a subscription-as-a-service software instance, such as the subscription-as-a-service software instance 19 of FIG. 1. It is to be understood that the node 40 of FIG. 2 corresponds in functionality to the node 14 of FIG. 1. In FIG. 2, the node 40 includes a computing device 42 that provides a processor device 44 coupled to a memory 46. The memory 46 may comprise a random access memory (RAM) such as a dynamic RAM (DRAM), as a non-limiting example. Stored within the memory 46 is an activation agent 48, corresponding in functionality to the activation agent 20 of FIG. 1. Upon execution of a subscription-as-a-service software instance 50, the activation agent 48 broadcasts an activation transaction 52 to one or more nodes 54 of a plurality of nodes 54(0)-54(X) of a customer network 56. The activation agent 48 subsequently receives a blockchain block 58 of a blockchain 60 indicating that activation of the subscription-as-a-service software instance 50 is approved.

Figure 3:
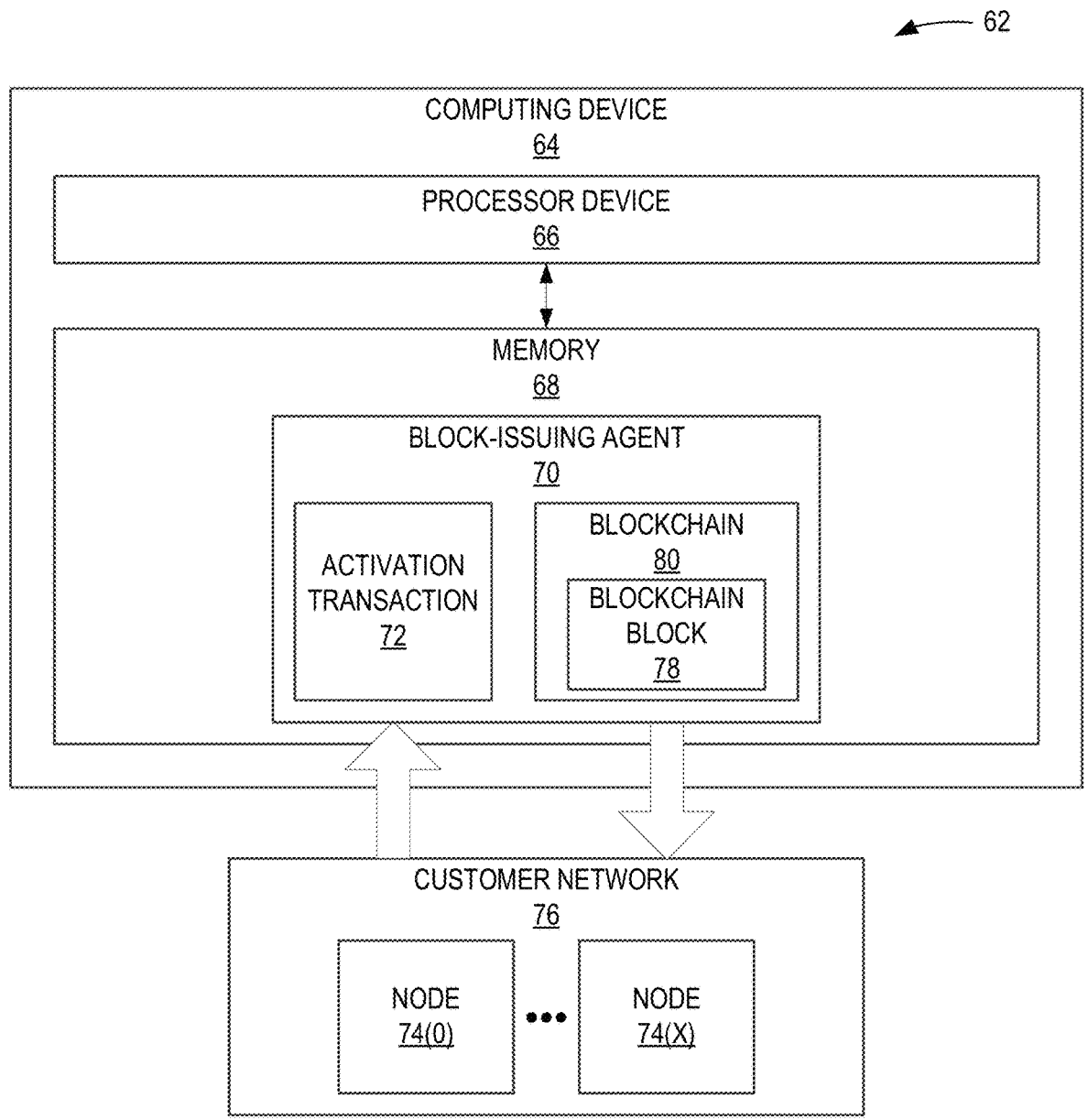
FIG. 3 is a block diagram of a block-issuing node for generating and broadcasting a blockchain block for activating the subscription-as-a-service software instance.

To illustrate an apparatus for generating and broadcasting a blockchain block for activating a subscription-as-a-service software instance, FIG. 3 is provided. In FIG. 3, a block-issuing node 62, corresponding in functionality to the block-issuing node 16 of FIG. 1, is shown. The block-issuing node 62 includes a computing device 64 comprising a processor device 66 coupled to a memory 68. As a non-limiting example, the memory 68 may be a RAM such as a DRAM. Within the memory 68 resides a block-issuing agent 70, corresponding in functionality to the block-issuing agent 24 of FIG. 1. The block-issuing agent 70 receives an activation transaction 72 from a node 74 of a plurality of nodes 74(0)-74(X) of a customer network 76. The block-issuing agent 70 then generates a blockchain block 78 as part of a blockchain 80 to package the activation transaction 72. The blockchain block 78 of the blockchain 80 is then broadcast to one or more nodes 74 of the plurality of nodes 74(0)-74(X).

Figure 4:
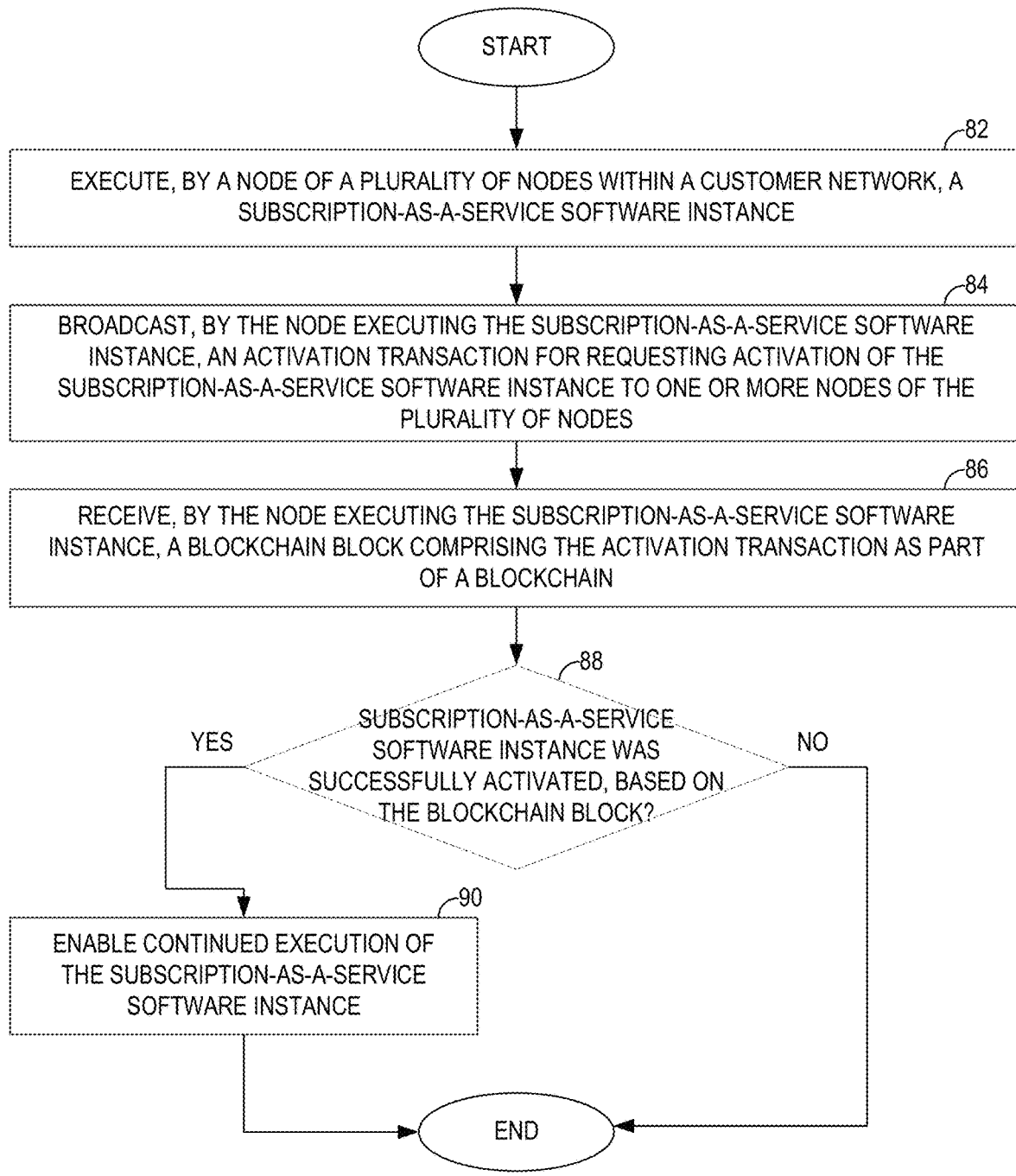
FIG. 4 is a flowchart of a method for providing blockchain-based subscription-as-a-service mechanisms on customer networks using the node of FIG. 2 according to one example.

FIG. 4 illustrates a method for providing blockchain-based subscription-as-a-service on customer networks according to one example. For the sake of clarity, elements of FIG. 1 are referenced in describing FIG. 4. In FIG. 4, operations begin with the node 14 executing the subscription-as-a-service software instance 19 (block 82). The activation agent 20 of the node 14 executing the subscription-as-a-service software instance 19 broadcasts the activation transaction 22 for requesting activation of the subscription-as-a-service software instance 19 to one or more nodes 18 of the plurality of nodes 18(0)-18(X) (block 84). The activation agent 20 of the node 14 executing the subscription-as-a-service software instance 19 then receives the blockchain block 26 comprising the activation transaction 22 as part of a blockchain 28 (block 86). The activation agent 20 of the node 14 then determines whether the subscription-as-a-service software instance 19 was successfully activated, based on the blockchain block 26 (block 88). If so, the node 14 enables continued execution of the subscription-as-a-service software instance 19 (block 90).

To illustrate additional operations according to one example for managing provision of the subscription-as-a-service software instance 19 using the node 14 and the block-issuing node 16 of FIG. 1, FIGS. 5A-5E are provided. Elements of FIG. 1 are referenced in describing FIGS. 5A-5E, for the sake of clarity. Operations in FIG. 5A begin with the node 14 executing the subscription-as-a-service software instance 19 (block 94). The activation agent 20 of the node 14 executing the subscription-as-a-service software instance 19 broadcasts the activation transaction 22 for requesting activation of the subscription-as-a-service software instance 19 to one or more nodes 18 of the plurality of nodes 18(0)-18(X) (block 96). In some examples, the block-issuing agent 24 of the block-issuing node 16 then receives the activation transaction 22 (block 98). The block-issuing agent 24 of the block-issuing node 16 may then determine whether the subscription-as-a-service software instance 19 should be activated, based on one or more customer-specified rules 36 (block 100). If so, processing resumes at block 102 of FIG. 5B. However, if the block-issuing agent 24 determines at decision block 100 that the subscription-as-a-service software instance 19 should not be activated, processing resumes at block 104 of FIG. 5C.

Figure 5A:
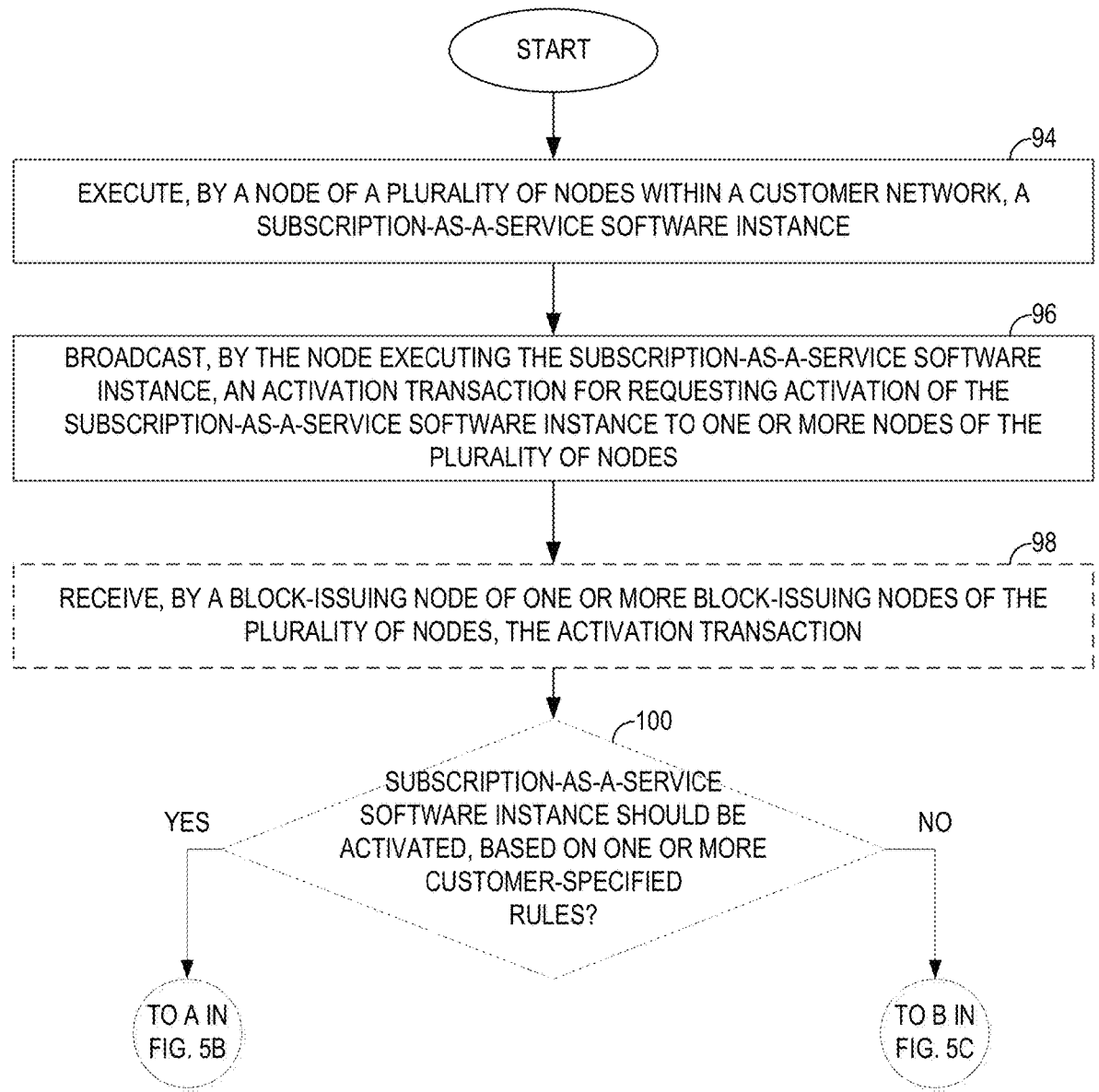
FIGS. 5A-5E are flowcharts illustrating additional operations according to one example for managing provision of the subscription-as-a-service software instance using the node of FIG. 2 and the block-issuing node of FIG. 3.
Figure 5B:
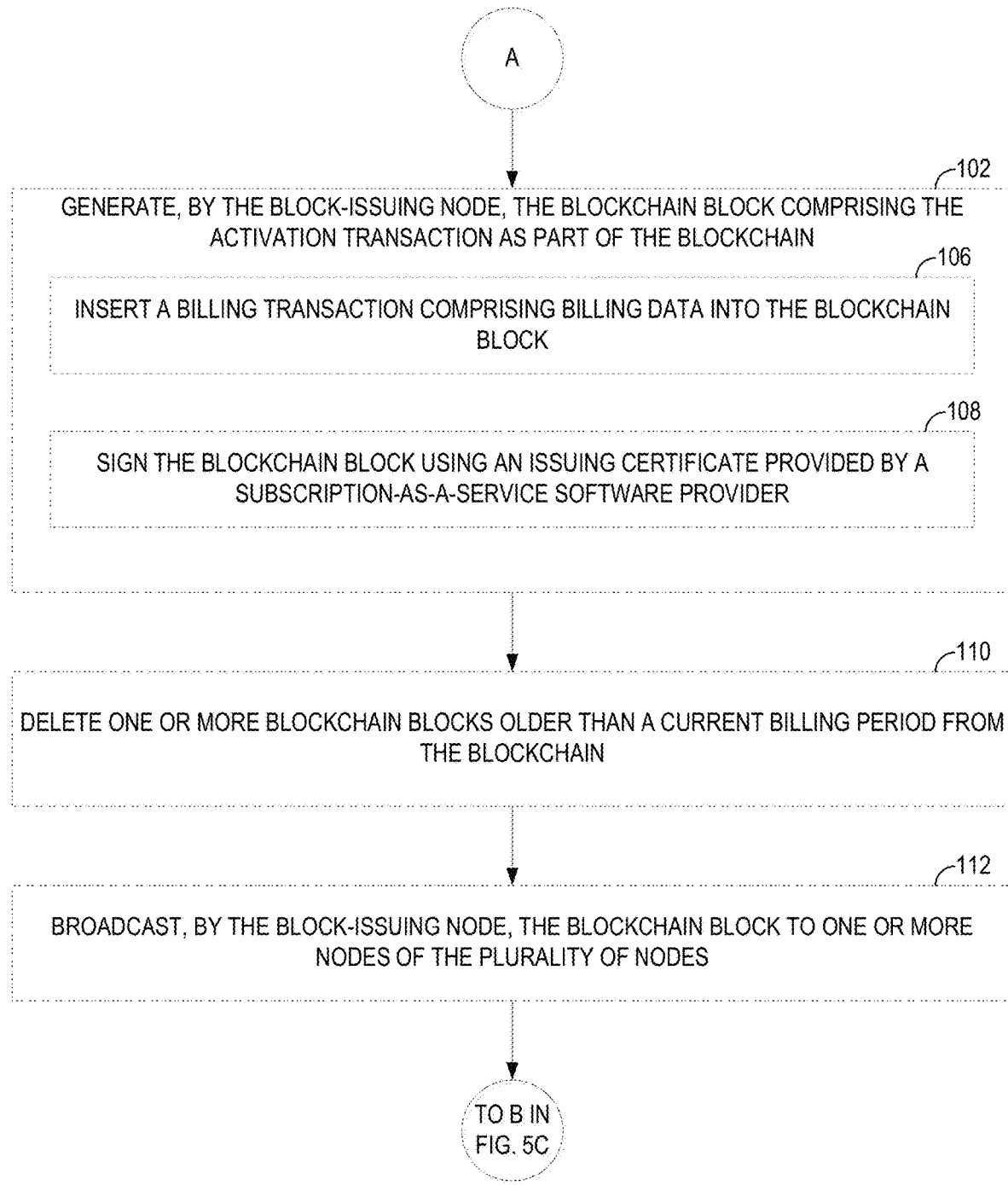

Referring now to FIG. 5B, if the block-issuing agent 24 of the block-issuing node 16 determines at decision block 100 of FIG. 5A that the subscription-as-a-service software instance 19 should be activated, the block-issuing agent 24 generates the blockchain block 26 comprising the activation transaction 22 as part of the blockchain 28 (block 102). In some examples, operations of block 102 for generating the blockchain block 26 may include inserting a billing transaction comprising billing data into the blockchain block 26 (block 104). Some examples may provide that the operations of block 102 for generating the blockchain block 26 may include signing the blockchain block 26 using an issuing certificate 30 provided by a subscription-as-a-service software provider (block 108).

According to some examples, the block-issuing agent 24 of the block-issuing node 16 may also delete blocks (such as the blockchain block 26) older than a current billing period from the blockchain 28 (block 110). The block-issuing agent 24 of the block-issuing node 16 then broadcasts the blockchain block 26 to one or more nodes 18 of the plurality of nodes 18(0)-18(X) (block 112). Processing then resumes at block 104 of FIG. 5C.

Figure 5C:
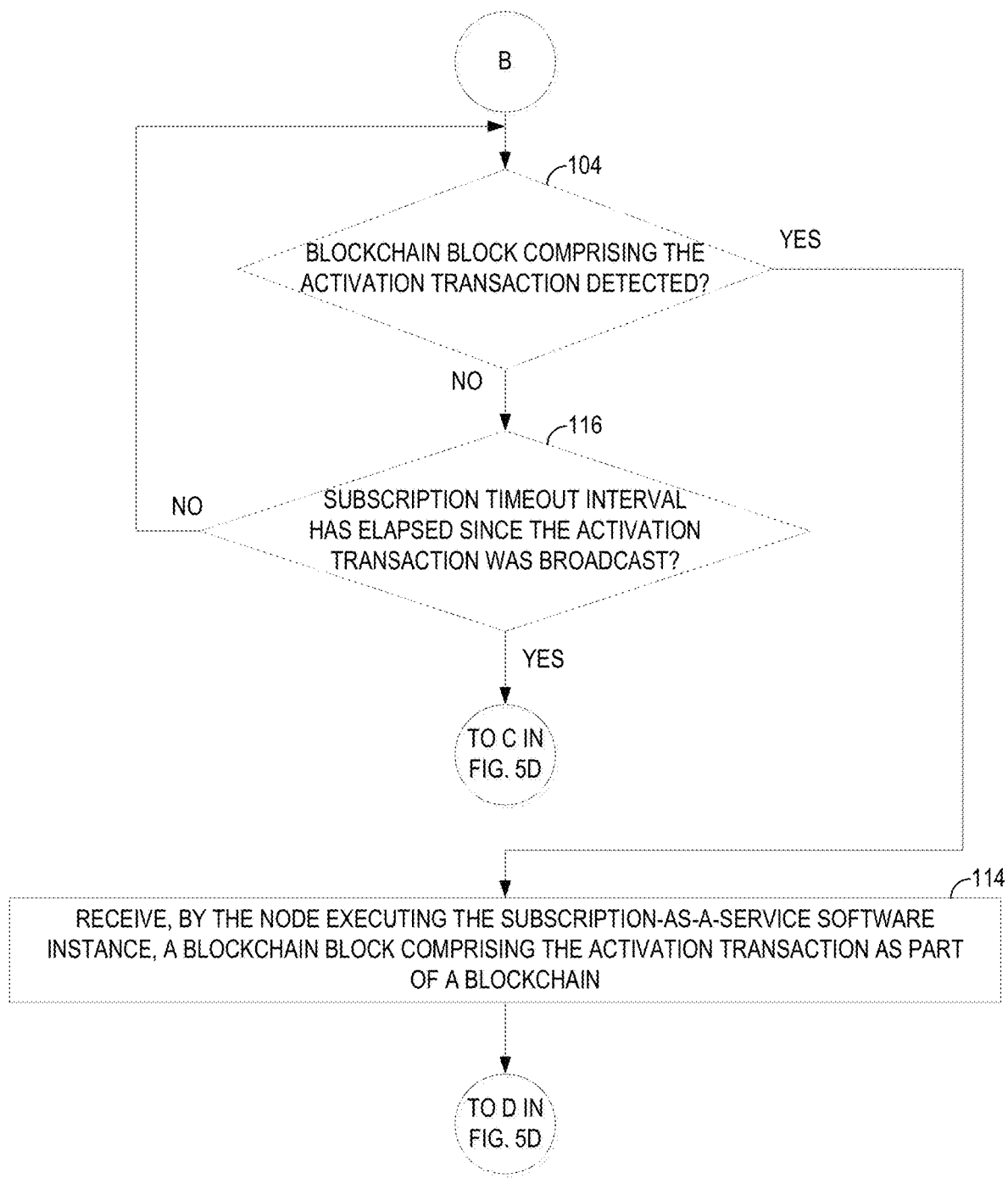

Turning attention now to FIG. 5C, the activation agent 20 of the node 14 may determine whether the blockchain block 26 comprising the activation transaction 22 has been detected (block 104). If so, processing resumes at block 114 of FIG. 5C. However, if the activation agent 20 determines at decision block 104 that the blockchain block 26 has not yet been detected, the activation agent 20 may next determine whether the subscription timeout interval 32 has elapsed since the activation transaction 22 was broadcast (block 116). If not, processing resumes at block 104 to further await the blockchain block 26. If the activation agent 20 determines at decision block 116 that the subscription timeout interval 32 has elapsed, processing resumes at block 118 of FIG. 5D.

Referring back to decision block 104, if the activation agent 20 of the node 14 determines that the blockchain block 26 has been detected, the activation agent 20 receives the blockchain block 26 comprising the activation transaction 22 as part of the blockchain 28 (block 114). Processing then resumes at block 120 of FIG. 5D.

Figure 5D:
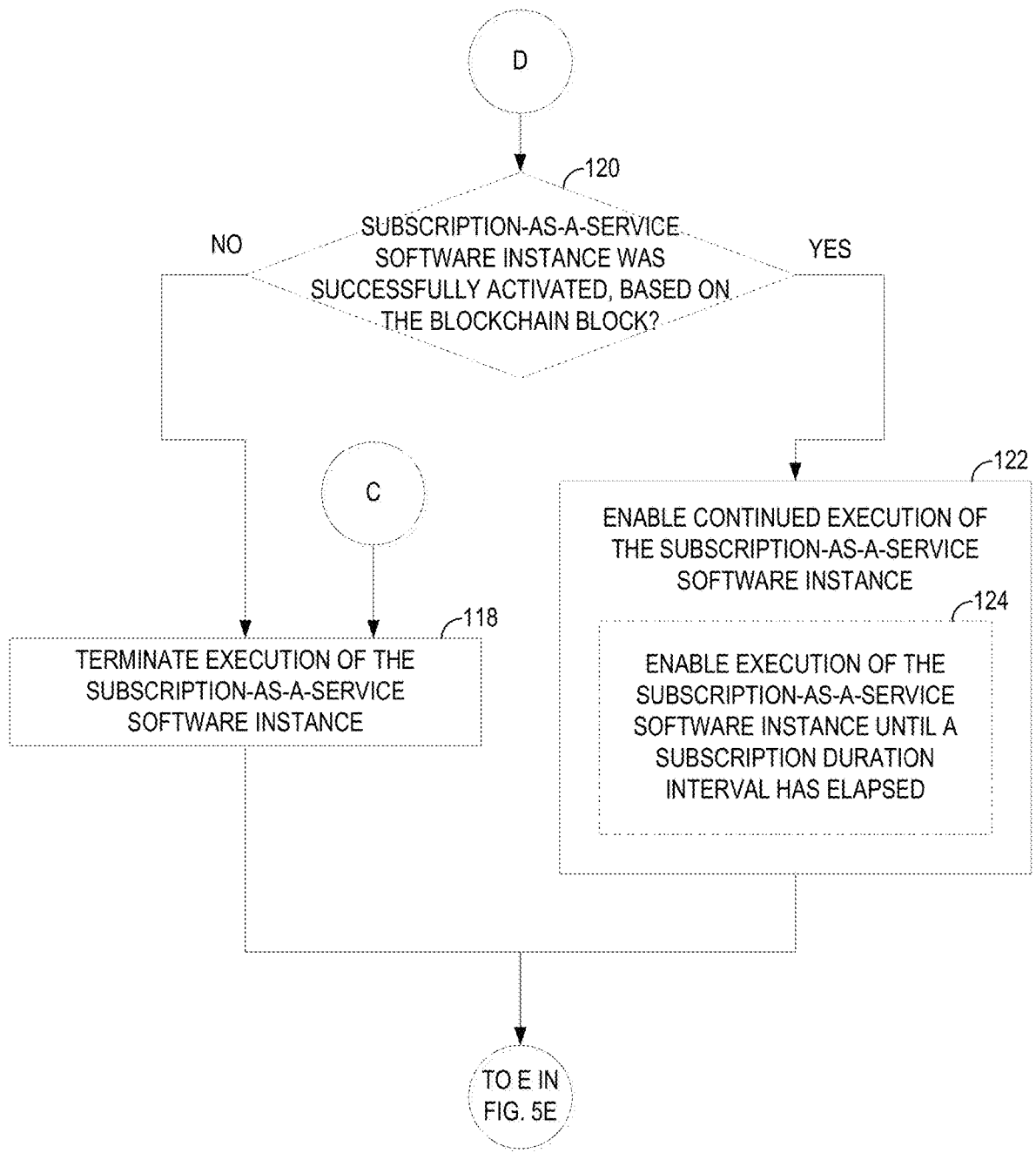

With reference to FIG. 5D, the activation agent 20 of the node 14 determines whether the subscription-as-a-service software instance 19 was successfully activated, based on the blockchain block 26 (block 120). In some examples, this determination may comprise determining that the blockchain block 26 containing the activation transaction 22 was received by the activation agent 20. If the subscription-as-a-service software instance 19 was not successfully activated (or if the activation agent 20 determined at decision block 116 of FIG. 5C that the subscription timeout interval 32 has elapsed), the node 14 terminates execution of the subscription-as-a-service software instance 19 (block 118). However, if the activation agent 20 of the node 14 determines at decision block 120 that the subscription-as-a-service software instance 19 was successfully activated, the node 14 enables continued execution of the subscription-as-a-service software instance 19 (block 122). In some examples, operations of block 122 for enabling continued execution of the subscription-as-a-service software instance 19 may include enabling execution of the subscription-as-a-service software instance 19 until the subscription duration interval 34 has elapsed (block 124). From blocks 122 and 124, processing resumes at block 126 of FIG. 5E.

Figure 5E:
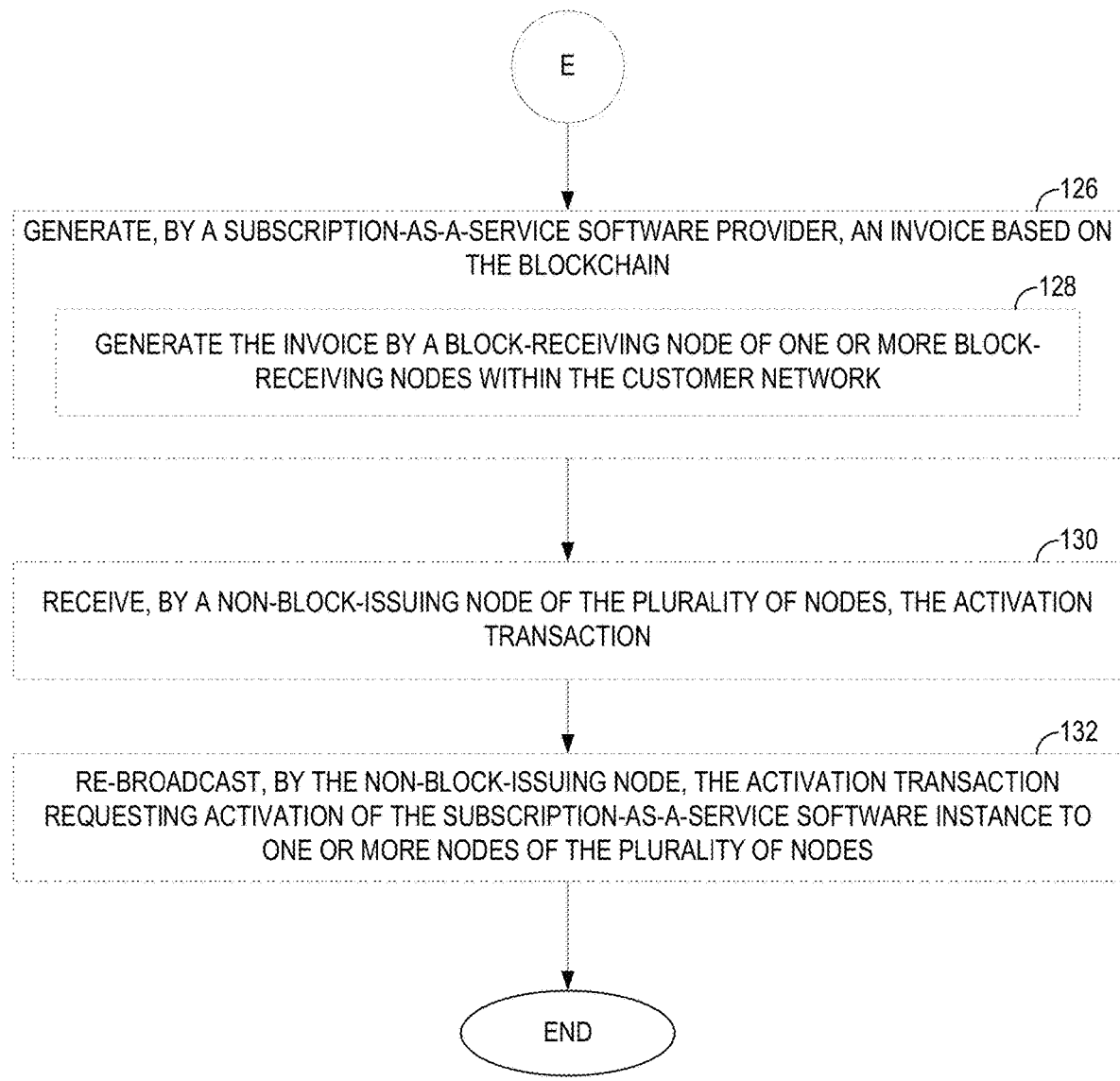

Turning now to FIG. 5E, a number of optional operations are described. It is to be understood that these operations may be performed before, concurrent with, or following the previously described operations. Some examples may provide that the invoice 38 is generated by the subscription-as-a-service software provider based on the blockchain 28 (block 126). In some examples, operations of block 126 for generating the invoice 38 may include generating the invoice 38 by a block-receiving node 18(0) within the customer network 12 (block 128). A non-block-issuing node, such as the non-block-issuing node 18(1), may receive the activation transaction 22 (block 130). The non-block-issuing node 18(1) may then re-broadcast the activation transaction 22 requesting activation of the subscription-as-a-service software instance 19 to one or more nodes 18 of the plurality of nodes 18(0)-18(X) (block 132).

Figure 6:
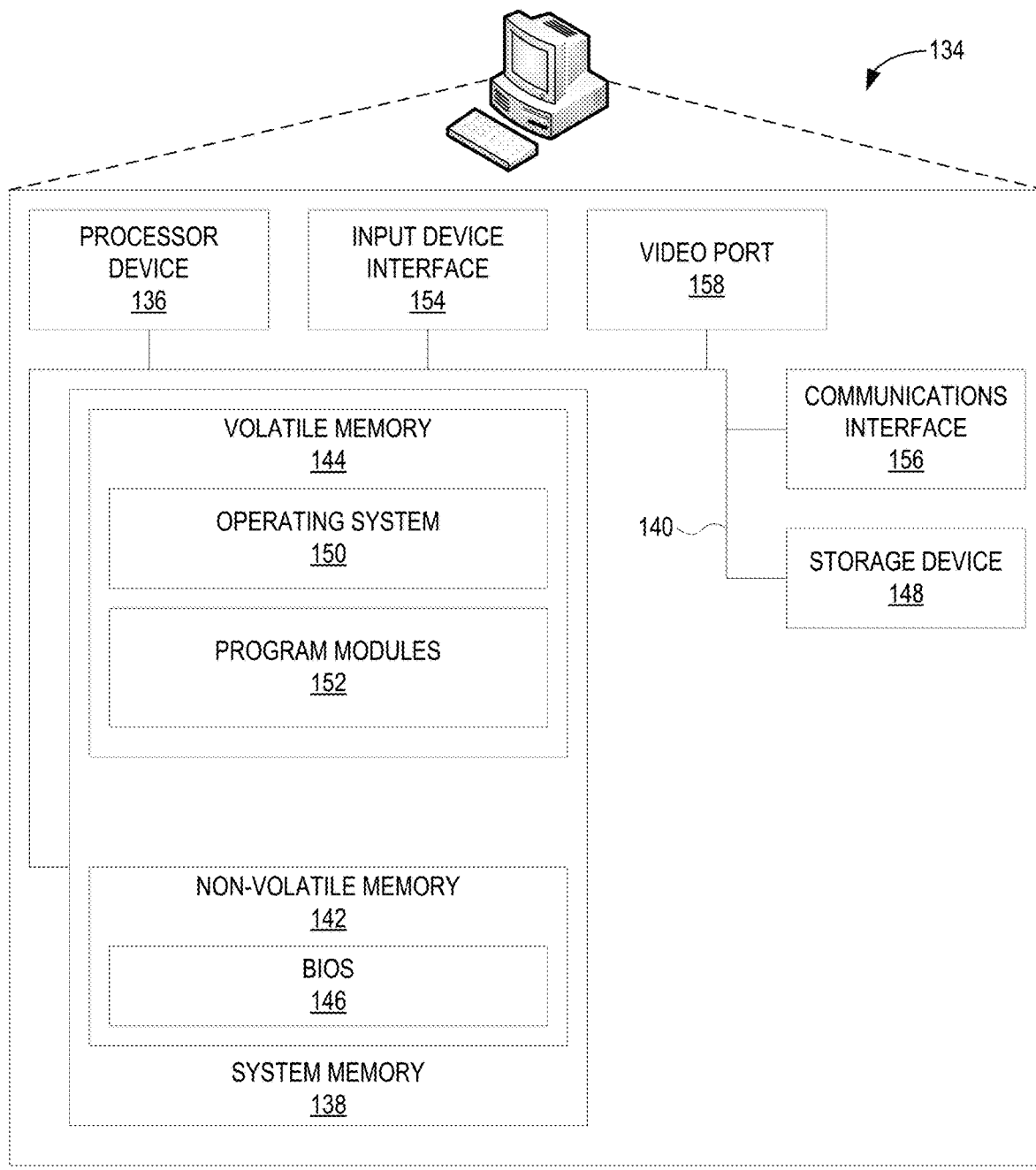
FIG. 6 is a block diagram of a computing device suitable for implementing examples according to one example.

FIG. 6 is a block diagram of a computing device 134, such as the node 14 and/or the block-issuing node 16 of FIG. 1, suitable for implementing examples according to one example. The computing device 134 may comprise any computing or electronic device capable of including firmware, hardware, and/or executing software instructions to implement the functionality described herein, such as a computer server, a desktop computing device, a laptop computing device, a smartphone, a computing tablet, or the like. The computing device 134 includes a processor device 136, a system memory 138, and a system bus 140. The system bus 140 provides an interface for system components including, but not limited to, the system memory 138 and the processor device 136. The processor device 136 can be any commercially available or proprietary processor.

The system bus 140 may be any of several types of bus structures that may further interconnect to a memory bus (with or without a memory controller), a peripheral bus, and/or a local bus using any of a variety of commercially available bus architectures. The system memory 138 may include non-volatile memory 142 (e.g., read-only memory (ROM), erasable ROM (EPROM), electrically EPROM (EEPROM), etc.), and volatile memory 144 (e.g., RAM). A basic input/output system (BIOS) 146 may be stored in the non-volatile memory 142 and can include the basic routines that help to transfer information among elements within the computing device 134. The volatile memory 144 may also include a high-speed RAM, such as static RAM, for caching data.

The computing device 134 may further include or be coupled to a non-transitory computer-readable storage medium such as a storage device 148, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 148 and other drives associated with computer-readable media and computer-usable media may provide non-volatile storage of data, data structures, computer-executable instructions, and the like. Although the description of computer-readable media above refers to an HDD, it should be appreciated that other types of media that are readable by a computer, such as Zip disks, magnetic cassettes, flash memory cards, cartridges, and the like, may also be used in the operating environment, and, further, that any such media may contain computer-executable instructions for performing novel methods of the disclosed examples.

A number of modules can be stored in the storage device 148 and in the volatile memory 144, including an operating system 150 and one or more program modules 152 which may implement the functionality described herein in whole or in part. It is to be appreciated that the examples can be implemented with various commercially available operating systems 150 or combinations of operating systems 150.

A number of modules can be stored in the storage device 148 and in the volatile memory 144, including, by way of non-limiting example, the activation agent 20 and/or the block-issuing agent 24 of FIG. 1. All or a portion of the examples may be implemented as a computer program product stored on a transitory or non-transitory computer-usable or computer-readable storage medium, such as the storage device 148, which includes complex programming instructions, such as complex computer-readable program code, to cause the processor device 136 to carry out the steps described herein. Thus, the computer-readable program code can comprise software instructions for implementing the functionality of the examples described herein when executed on the processor device 136. The processor device 136 may serve as a controller, or control system, for the computing device 134 that is to implement the functionality described herein.

An operator may also be able to enter one or more configuration commands through a keyboard (not illustrated), a pointing device such as a mouse (not illustrated), or a touch-sensitive surface such as a display device (not illustrated). Such input devices may be connected to the processor device 136 through an input device interface 154 that is coupled to the system bus 140 but can be connected by other interfaces, such as a parallel port, an Institute of Electrical and Electronic Engineers (IEEE) 1394 serial port, a Universal Serial Bus (USB) port, an IR interface, and the like.

The computing device 134 may also include a communications interface 156 suitable for communicating with a network as appropriate or desired. The computing device 134 may also include a video port 158 to interface with a display device to provide information to a user.

What is claimed is:

1. A method for providing blockchain-based subscription-as-a-service on customer networks, comprising:
   executing, by a node of a plurality of nodes within a customer network, a first subscription-as-a-service software instance;
   in conjunction with executing the first subscription-as-a-service software instance, broadcasting, by an activation agent of the node executing the first subscription-as-a-service software instance, an activation transaction for requesting activation of the first subscription-as-a-service software instance to one or more nodes of the plurality of nodes;
   generating, by a block-issuing agent of a block-issuing node, a blockchain block comprising the activation transaction as part of a blockchain and inserting a billing transaction comprising billing data into the blockchain block;
   receiving, by the activation agent of the node executing the first subscription-as-a-service software instance, in response to broadcasting the activation transaction, the blockchain block comprising the activation transaction as part of the blockchain;
   determining, by the activation agent of the node executing the first subscription-as-a-service software instance, whether the first subscription-as-a-service software instance was successfully activated, based on the blockchain block;
   responsive to determining that the first subscription-as-a-service software instance was successfully activated, enabling continued execution of the first subscription-as-a-service software instance;
   executing, by the node of the plurality of nodes executing the first subscription-as-a-service software instance, a second subscription-as-a-service software instance;
   in conjunction with executing the second subscription-as-a-service software instance, broadcasting, by the activation agent, a second activation transaction for requesting activation of the second subscription-as-a-service software instance to the one or more nodes of the plurality of nodes;
   determining, by the activation agent of the node executing the second subscription-as-a-service software instance, that a subscription timeout interval has elapsed since the second activation transaction was broadcast;
   responsive to determining that the subscription timeout interval has elapsed and to determining that no activation transaction for the second subscription-as-a-service software instance has been received in a blockchain block, terminating execution of the second subscription-as-a-service software instance; and
   deleting, by the block-issuing agent, blocks older than a current billing period from the blockchain.

2. The method of claim 1, wherein enabling continued execution of the first subscription-as-a-service software instance comprises enabling execution of the first subscription-as-a-service software instance until a subscription duration interval has elapsed.

3. The method of claim 1, further comprising, prior to receiving the blockchain block:
   receiving, by the block-issuing agent of the block-issuing node of one or more block-issuing nodes of the plurality of nodes, the activation transaction; and
   broadcasting, by the block-issuing agent of the block-issuing node, the blockchain block to one or more nodes of the plurality of nodes.

4. The method of claim 1, further comprising, prior to generating the blockchain block comprising the activation transaction, determining, by the block-issuing agent of the block-issuing node, whether the first subscription-as-a-service software instance should be activated, based on one or more customer-specified rules;
   wherein generating, by the block-issuing agent of the block-issuing node, the blockchain block is responsive to determining that the first subscription-as-a-service software instance should be activated.

5. The method of claim 4, wherein the one or more customer-specified rules comprise one or more of a rule regarding a number of active subscriptions and a rule regarding a subscription budget.

6. The method of claim 1, wherein generating the blockchain block comprising the activation transaction comprises signing, by the block-issuing node, the blockchain block using an issuing certificate provided by a subscription-as-a-service software provider.

7. The method of claim 1, further comprising:
   receiving, by a non-block-issuing node of the plurality of nodes, the activation transaction; and
   re-broadcasting, by the non-block-issuing node, the activation transaction requesting activation of the first subscription-as-a-service software instance to one or more nodes of the plurality of nodes.

8. A computer program product for providing blockchain-based subscription-as-a-service on customer networks, the computer program product stored on a non-transitory computer-readable storage medium and including instructions to cause one or more processor devices to:
   execute, by a node of a plurality of nodes within a customer network, a first subscription-as-a-service software instance;
   in conjunction with executing the first subscription-as-a-service software instance, broadcast, by an activation agent of the node executing the first subscription-as-a-service software instance, an activation transaction for requesting activation of the first subscription-as-a-service software instance to one or more nodes of the plurality of nodes;

generate, by a block-issuing agent of a block-issuing node, a blockchain block comprising the activation transaction as part of a blockchain and insert a billing transaction comprising billing data into the blockchain block;

receive, by the activation agent of the node executing the first subscription-as-a-service software instance, in response to broadcasting the activation transaction, the blockchain block comprising the activation transaction as part of the blockchain;

determine, by the activation agent of the node executing the first subscription-as-a-service software instance, whether the first subscription-as-a-service software instance was successfully activated, based on the blockchain block;

responsive to determining that the first subscription-as-a-service software instance was successfully activated, enable continued execution of the first subscription-as-a-service software instance;

execute, by the node of the plurality of nodes executing the first subscription-as-a-service software instance, a second subscription-as-a-service software instance;

in conjunction with executing the second subscription-as-a-service software instance, broadcast, by the activation agent, a second activation transaction for requesting activation of the second subscription-as-a-service software instance to the one or more nodes of the plurality of nodes;

determine, by the activation agent of the node executing the second subscription-as-a-service software instance, that a subscription timeout interval has elapsed since the second activation transaction was broadcast;

responsive to determining that the subscription timeout interval has elapsed and to determining that no activation transaction for the second subscription-as-a-service software instance has been received in a blockchain block, terminate execution of the second subscription-as-a-service software instance; and delete, by the block-issuing agent, blocks older than a current billing period from the blockchain.

9. A system for providing blockchain-based subscription-as-a-service on customer networks, comprising one or more processor devices to:

execute, by a node of a plurality of nodes within a customer network, a first subscription-as-a-service software instance;

in conjunction with executing the first subscription-as-a-service software instance, broadcast, by an activation agent of the node executing the first subscription-as-a-service software instance, an activation transaction for requesting activation of the first subscription-as-a-service software instance to one or more nodes of the plurality of nodes;

generate, by a block-issuing agent of a block-issuing node, a blockchain block comprising the activation transaction as part of a blockchain and insert a billing transaction comprising billing data into the blockchain block;

receive, by the activation agent of the node executing the first subscription-as-a-service software instance, in response to broadcasting the activation transaction, the blockchain block comprising the activation transaction as part of the blockchain;

determine, by the activation agent of the node executing the first subscription-as-a-service software instance, whether the first subscription-as-a-service software instance was successfully activated, based on the blockchain block;

responsive to determining that the first subscription-as-a-service software instance was successfully activated, enable continued execution of the first subscription-as-a-service software instance;

execute, by the node of the plurality of nodes executing the first subscription-as-a-service software instance, a second subscription-as-a-service software instance;

in conjunction with executing the second subscription-as-a-service software instance, broadcast, by the activation agent, a second activation transaction for requesting activation of the second subscription-as-a-service software instance to the one or more nodes of the plurality of nodes;

determine, by the activation agent of the node executing the second subscription-as-a-service software instance, that a subscription timeout interval has elapsed since the second activation transaction was broadcast;

responsive to determining that the subscription timeout interval has elapsed and to determining that no activation transaction for the second subscription-as-a-service software instance has been received in a blockchain block, terminate execution of the second subscription-as-a-service software instance; and delete, by the block-issuing agent, blocks older than a current billing period from the blockchain.

10. The system of claim 9, wherein the one or more processor devices are to sign the blockchain block using an issuing certificate provided by a subscription-as-a-service software provider to generate the blockchain block comprising the activation transaction.

* * * * *